INVENTOR.
SZILARD BERENYI

INVENTOR.
SZILARD BERENYI

United States Patent Office 3,017,569
Patented Jan. 16, 1962

3,017,569
METHOD AND POTENTIOMETER-TITRIMETER FOR MEASURING ELECTROIONIC POTENTIALS
Szilard Berenyi, Zarate, Argentina
(22—35 93rd St., Jackson Heights 69, New York, N.Y.)
Filed Mar. 2, 1959, Ser. No. 796,517
11 Claims. (Cl. 324—29)

This invention refers to an improved method for measuring electroionic potentials by comparing the electroionic potential of one or more solutions under measurement with a reference potential which, in contraposition to the known methods and apparatus is supplied by one or more standard solutions of known electroionic potential. This invention further refers to a potentiometer-titrimeter embodying the principle of the improved method according to the present invention.

The present methods and apparatus for measuring electroionic potentials present several drawbacks more particularly with respect to lack of stability and insufficient precision of measurement. A certain group of factors affecting the stability and precision of measurement of the known apparatus is represented by the inherent imperfections of the measuring device, while a further group includes all imperfections of the measuring electrodes which, as known, are heavily influenced by ambient humidity, temperature, conductivity of the solution under measurement, pretreatment, ageing and the harmful influence of certain difficult mediae.

One of the known potentiometers-titrimeters has been designed with a view of overcoming the above disadvantages by comparing the unknown electroionic potential with an electrical potential which has been adjusted previously to correspond to the electroionic potential of a known standard solution. However, in view of the fact that such previous calibration is dependent on the ambient conditions and the state of the measuring electrodes at the calibration instant, this calibration will stay constant only under practically unattainable ideal conditions of stability so that in practice the calibration point, with respect to a measurement carried out at a later instant, may not correspond anymore to the electroionic potential of the same standard solution which, in the new conditions of measurement supplies a different potential for the same measuring magnitude, so that when adjusting the instrument on the original calibration point represented by the electrical potential with a view of compensating the measuring error, it may happen not only that such compensation is not achieved but that instead a still greater error is introduced into the measurement.

In contraposition to the known methods for measuring electroionic potentials, the novel method according to the present invention is based on the use of at least one reference source of electroionic potential supplied by at least one standard solution (buffer solution) and derived by means of a set of electrodes of the type generally used in this class of measurements, in combination with an electrical potential which is injected into the circuit of at least one of the measuring electrodes so as to compensate the always existing small potential differences between measuring electrodes in general, even if they are submerged in the same standard solution.

Thus basically, the method of measuring electroionic potentials according to the present invention comprises the steps of comparing, either successively or simultaneously, the electroionic potentials of two identical standard solutions by means of two pairs of measuring electrodes of the same type, injecting into the circuit of at least one of said pairs of electrodes an electrical potential to compensate the inherent and small differences between the potentials supplied by said pairs of electrodes to obtain a first reading on a measuring instrument corresponding to the nominal electroionic potential of said two standard solutions, introducing one of the said pairs of measuring electrodes into the solution of unknown electroionic potential to be measured to obtain a second reading corresponding directly to said unknown electroionic potential, controlling the electroionic potential of the untouched standard solution to obtain a third reading on said measuring instrument constituting an indirect indication of the measuring error which appeared in the meantime, readjusting the said measuring instrument to said first reading without varying said electric potential and measuring again the electroionic potential of said unknown solution to obtain a fourth reading on said instrument constituting a controlled exact and direct indication of said unknown electroionic potential.

In general, the measuring instrument will be constituted by an electronic voltmeter of any known design of normally high input impedance, and provided with electric and/or electronic means for adjusting the pointer of the measuring instrument on any desired point of the measuring scale (the so-called "zero-adjusting means"). It is advantageous to use an electronic voltmeter of the bridge circuit type and the standard and unknown electroionic potentials are applied either successively to the same arm of the voltmeter bridge circuit or simultaneously to opposite arms of this circuit.

Consequently, the improved potentiometer-titrimeter designed on the principles of the method according to the present invention comprises, basically, a high input impedance bridge-circuit electronic voltmeter the measuring instrument of which is provided with means for adjusting the pointer on any point of the instrument scale, at least one set of control input terminals and at least one set of indicating input terminals, at least one pair of control electrodes constituted by a reference electrode and a measuring electrode, at least one pair of indicating electrodes constituted by a substantially identical reference electrode and a substantially identical measuring electrode, means to connect said pair of control electrodes to said set of control input terminals, means to connect said pair of indicating electrodes to said set of indicating input terminals, a standard solution surrounding said pair of control electrodes, means to connect said control input electrodes and said indicating input electrodes successively to the same arm, or simultaneously to opposite arms, of the voltmeter bridge circuit, and at least one source of electrical counter potential connected into the circuit of at least one of said pairs of electrodes.

In general, for adjusting the instrument pointer of the electronic voltmeter on any desired point of the instrument scale it is possible to use any of the known circuit arrangements of corresponding type. In one embodiment of the potentiometer-titrimeter according to the present invention, the bridge circuit electronic voltmeter is formed of two triodes connected in a cathode-follower arrangement, both cathode resistors being interconnected by a potentiometer used to modify the ratio of the cathode load resistors. On using an electronic voltmeter the indicating range of the voltmeter scale corresponding to the measured electroionic potentials can be modified at will by connecting in series with the measuring instrument one or more fixed and/or variable resistors.

The source or sources of electric counterpotential which form part of the potentiometer-titrimeter according to the present invention are of the variable electrical potential type and are either formed by separate voltage supplies or form part of the stabilized electrical supply source of the potentiometer-titrimeter.

The main object of the present invention is to provide a method and a potentiometer-titrimeter for measuring one or more unknown electroionic potentials in a minimum of time and with a maximum of precision and for controlling instantaneously the precision of measurement without interrupting the physical contact between the electrodes and the respective solutions.

A further object of the present invention is to provide an improved potentiometer-titrimeter in which the small intrinsic differences between the pairs of measuring electrodes are compensated by means of one or more electric counterpotentials, so that different unknown solutions can be measured successively with the same instrument without the necessity of taking into consideration these intrinsic differences of the measuring electrodes.

A still further object of the present invention is to provide a method and an improved potentiometer-titrimeter in which the reference potential is supplied by at least one standard solution of known electroionic potential.

Still another object of the present invention is to provide an improved potentiometer-titrimeter in which the electric counterpotential is derived from the voltage supply source of the potentiometer.

These and other objects and advantages of the invention will become apparent as the specification proceeds.

The invention will now be more specifically described with reference to the accompanying drawings which are to be understood explicative of the invention and not limitative of its scope.

Figure 5:
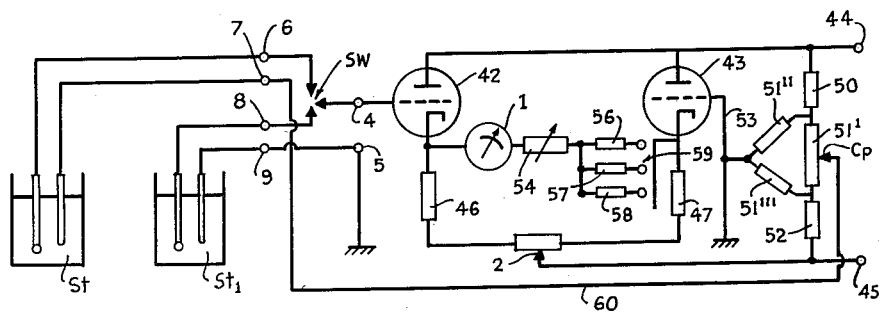
Figure 6:
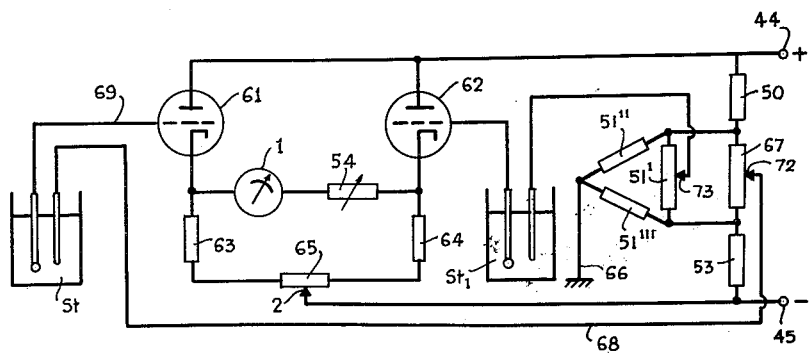

FIG. 5 is a modification of the potentiometer-titrimeter of the previous figure but showing another embodiment of the "zero" adjusting means of the instrument pointer and for using the instrument in several sensibility ranges, the variable electric counterpotential being derived from the stabilized voltage supply source of the potentiometer, and FIG. 6 is a schematic circuit diagram of a bilateral input potentiometer-titrimeter of the type illustrated in the previous figure but showing the possibility of deriving and simultaneously using various different counterpotentials from the stabilized voltage supply source of the potentiometer.

The same reference numerals and characters indicate like or corresponding parts or elements throughout the drawings.

Figure 1:
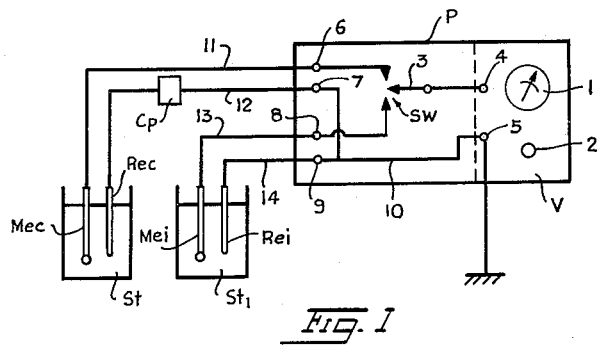
FIG. 1 is a schematic block diagram of one preferred embodiment of the improved potentiometer-titrimeter according to the present invention of the unilateral input type.

The improved potentiometer-titrimeter P according to the present invention shown in FIG. 1 comprises basically, an electronic voltmeter V which, usually, is of the balanced bridge-circuit type including a current measuring instrument 1 which operates as electroionic potential indicator and means, represented by knob 2, for adjusting the position of the instrument pointer on any desired point of the instrument scale. These means, not shown in the figure, can be any of the known zero adjusting means used in electronic voltmeters.

The potentiometer-titrimeter shown in FIG. 1, is of the so-called unilateral input type in which the electroionic potential to be measured is applied through movable arm 3 of a selector switch Sw to one arm of the voltmeter bridge circuit, by means of voltmeter input terminals 4 and 5.

Potentiometer-titrimeter P shown in FIG. 1 comprises further one set of control input terminals 6, 7 and one set of indicating terminals 8, 9. As can be observed in FIG. 1, terminals 7, 9 are interconnected and, by means of conductor 10, are connected to input terminal 5 of voltmeter V which is connected to ground potential or the neutral point of the instrument.

Control terminal 6 and measuring terminal 8 are each connected to the contacts of a selector switch Sw so that in one position of switch Sw, control terminals 6, 7 are connected through to input terminals, 4, 5 of voltmeter V, while in the other position of switch Sw, measuring terminals 8, 9 are connected through to input terminals 4, 5 of voltmeter V.

Control terminals 6, 7 are connected through conductors 11, 12 respectively to a pair of control electrodes M$ec$ and R$ec$, respectively which are submerged in a standard solution S$t$ of known electroionic potential.

As can be observed in FIG. 1, according to one of the main features of the improved potentiometer-titrimeter according to the present invention, a source of variable electric conterpotential Cp is inserted into conductor 12 to compensate the intrinsic difference between the pair of control electrodes R$ec$ and M$ec$ and the pair of indicating electrodes R$ei$ and M$ei$ which are connected, through conductors 13, 14 respectively, to measuring terminals 8, 9 respectively, of potentiometer P and which are submerged, at first, in a second standard solution S$t$1 which is identical with standard solution S$t$.

The potentiometer-titrimeter shown in FIG. 1 is used as follows:

At first arm 3 of switch Sw is connected to indicating terminal 8, indicating electrodes M$ei$ and R$ei$ are submerged in a standard solution S$t$1 of known electroionic potential, and the instrument pointer of voltmeter V is adjusted by means of knob 2 on the reading (first reading or magnitude) corresponding to the known electroionic potential of standard solution S$t$1. Then, control electrodes M$ec$ and R$ec$ are submerged in the identical standard solution S$t$, arm 3 of switch Sw is connected to control terminal 6 of potentiometer P and variable electrical counterpotential Cp is adjusted so that the instrument pointer reaches the position (second reading or magnitude) corresponding to the electroionic potential of standard solution S$t$1. Thus variable counterpotential Cp is used, according to a further basic feature of the present invention, to compensate for the unavoidable and inherent small differences which exist between both pairs of control and indicating electrodes M$ec$, R$ec$ and M$ei$, R$ei$, respectively. Arm 3 of switch Sw is connected again to indicating terminal 8 of potentiometer P which is now in a position for measuring any solution of unknown electroionic potential.

For this purpose and without modifying the adjustments of knob 2 and counterpotential Cp, indicating electrodes M$ei$ and R$ei$ are withdrawn from standard solution S$t$1 and submerged into the solution of unknown electroionic potential which is to be measured. In this condition of the potentiometer-titrimeter according to the present invention, the pointer of instrument 1 provides a direct indication (third reading or magnitude) of the unknown electroionic potential.

The potentiometer-titrimeter is now calibrated at one point of the instrument scale and a series of measurements can now be carried out therewith. However, since in the course of time the calibration of potentiometer P may have varied, it is possible, at any desired moment, to carry out an instantaneous control of the measuring error by connecting arm 3 of switch Sw to control terminal 6 and thus obtaining on the instrument scale a new reading (fourth reading or magnitude) which, while corresponding to the known electroionic potential of standard solutions S*t* and S*t*1, in the case of a variation is shifted on the instrument scale either to the left or to the right with respect of the previously calibrated point. The difference in scale readings corresponds to the measuring error, and it is possible to continue the measurements by taking into consideration this error.

Of course, it is much more convenient to readjust potentiometer-titrimeter P to its original calibration point by bringing back the instrument pointer, with the exclusive use of zero setting knob 2 and without modifying the adjustment of counterpotential $C_p$, to its original calibration point (fifth reading or magnitude) so that all further measurements do not contain any more measuring errors.

It will be understood that the source of variable electric counterpotential $C_p$, instead of being inserted into the conductor corresponding to reference electrode R*ec* of the pair of control electrodes submerged into standard solution S*t*, can be also inserted either into conductor 11 corresponding to measuring electrode M*ec* of the same pair or into any of the two indicating electrodes M*ei* and R*ei*.

When desired and convenient, separate sources of variable electric counterpotentials can be inserted into the circuit of both pairs of control and indicating electrodes.

It will be understood now that the method of measuring unknown electroionic potentials according to the present invention comprises, basically the steps of measuring electronically with the use of a pair of indicating electrodes the electroionic potential of a first standard solution (S*t*1) of known electroionic potential to obtain a first magnitude measuring electronically with the use of a pair of substantially identical control electrodes the electroionic potential of a second standard solution (S*t*) of identical electroionic potential to obtain a second magnitude injecting into the circuit of at least one of the said control and indicating electrodes a variable electrical counter potential to equalize said first and said second magnitudes, and substituting a solution of unknown electroionic potential for said first standard solution to obtain a third magnitude corresponding directly to said unknown electroionic potential.

The improved method for measuring electroionic potentials according to the present invention comprises, further, the steps measuring electronically for control purposes, the electroionic potential of said second standard solution (S*t*) to obtain a fourth magnitude directly indicative of the measuring error, and readjusting the electronic measuring potential while maintaining constant said electric counterpotential to obtain a fifth magnitude equal to said first magnitude and representing an exact direct and controlled indication of the unknown potential to be measured.

Figure 2:
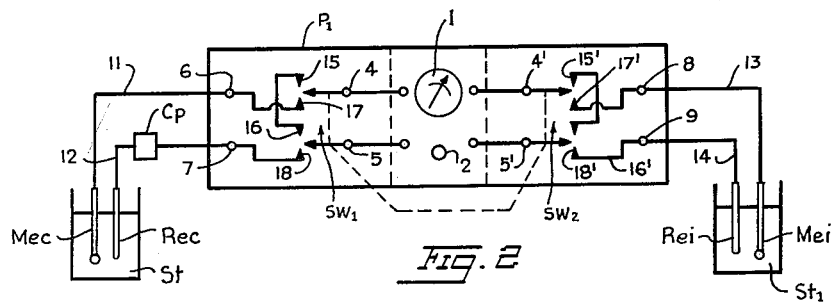
FIG. 2 is a schematic block diagram of a further preferred embodiment of the potentiometer-titrimeter according to the present invention of the bilateral input type.

While in the potentiometer-titrimeter P according to the present invention input terminals 4, 5 of voltmeter V are connected to one arm of the volt meter bridge circuit (not shown in the figure), so as to provide a unilateral input type potentiometer in which the measuring of both standard solutions S*t* and S*t*1, the measuring of the unknown electroionic potential and the instantaneous control recalibration steps are carried out successively by connecting successively the various solutions to one and the same arm of the voltmeter bridge circuit, the potentiometer-titrimeter $P_1$ according to the present invention, shown in FIG. 2, is of the so-called bilateral input type which comprises two sets of voltmeter input terminals 4, 5 and 4', 5', respectively which are connected on one hand to opposite arms of the voltmeter bridge circuit and, on the other hand, to the pair of control electrodes M*ec*, R*ec* and the pair of indicating electrodes M*ei*, R*ei*, respectively, each through a double inverter switch S*w*1 and S*w*2, respectively, which are coupled to a common governing means not shown in the figure.

As can be observed in FIG. 2, control terminals 6, 7 are connected to switch contact points 17, 18 of switch S*w*1 respectively, while switch contact points 15, 16 of the same switch are shortcircuited. Indicating terminals 8, 9 of potentiometer P' are connected in the same manner to switch contact points 17', 18' of switch S*w*2, the switch contact points 15', 16' of which are also shortcircuited.

The bilateral input type potentiometer $P_1$ shown in FIG. 2 is used as follows:

Switches S*w*1 and S*w*2 are connected simultaneously to the shortcircuited switch contact points 15, 16 and 15', 16', respectively and by means of adjusting knob 2 the pointer of instrument 1 is adjusted on a point of the instrument scale corresponding to the nominal electroionic potential of standard solutions S*t* and S*t*1.

Connecting simultaneously switches S*w*1 and S*w*2 to switch contacts 17, 18 and 17', 18', respectively, the electroionic potentials of standard solutions S*t* and S*t*1 are applied simultaneously to voltmeter input terminals 4, 5 and 4', 5', respectively.

Though the electroionic potentials of standard solutions S*t* and S*t*1 are identical, the electroionic potentials applied by the pairs of control electrodes M*ec*, R*ec* and indicating electrodes M*ei*, R*ei* to these voltmeter input terminals can be slightly different due to the inherent and unavoidable slight differences between these pairs of electrodes. This difference becomes apparent by a slight shifting of the position of the instrument pointer with respect to the original setting obtained with switches S*w*1 and S*w*2 in the other position. By means of the source of variable electric counterpotential $C_p$ which, in the embodiment shown in FIG. 2, is inserted into the circuit of reference electrode R*ec* of the pair of control electrodes, the instrument pointer is brought again to the said original setting corresponding to the nominal electroionic potential of both standard solution.

The solution to be measured is substituted for standard solution S*t*1 with switches S*w*1 and S*w*2 in the lower position, so that instrument 1 indicates the difference between the electroionic potential of standard solution S*t* and the unknown electroionic potential.

The instantaneous control of the measuring error is carried out in potentiometer $P_1$ of FIG. 2 by connecting switches S*w*1 and S*w*2 to the shortcircuited switch contacts 15, 16 and 15', 16', respectively and resetting the instrument pointer, by means of knob 2 and without modifying the adjustment of variable counterpotential $C_p$, to the original setting corresponding to the nominal electroionic potential of standard solutions S*t* and S*t*1.

The advantage of the bilateral input type potentiometer $P_1$ of FIG. 2 with respect to the unilateral input type potentiometer P of FIG. 1 resides in the fact that reference standard solution (S*t*) remains always connected to potentiometer $P_1$ and that the switching operations for calibration, measuring and instantaneous control purposes are considerably simplified.

Figure 3:
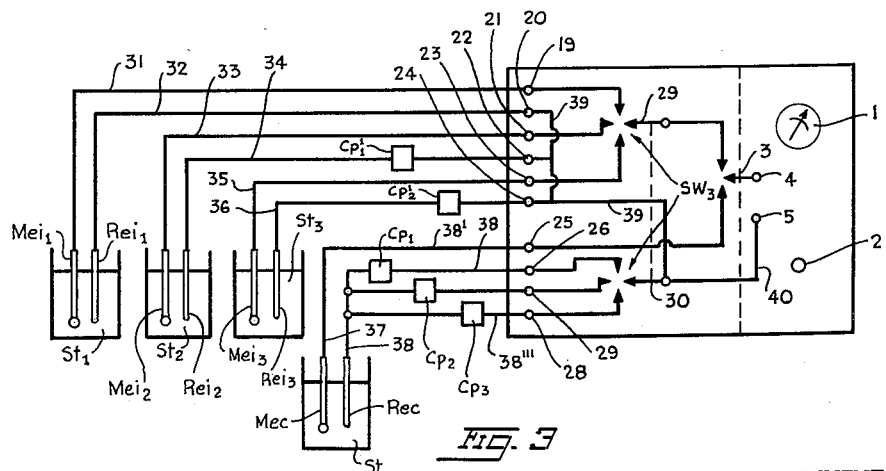
FIG. 3 is a schematic block diagram of a modified embodiment of potentiometer-titrimeter P shown in FIG. 1, but adapted for measuring a plurality of different unknown electroionic potentials with the use of one standard solution combined with several different electrical counterpotentials for calibration purposes.

While potentiometers-titrimeters P and $P_1$ of FIGS. 1 and 2, respectively, have been designed for being calibrated on only one predetermined point of the instrument scale corresponding to the electroionic potential of standard solution S*t*, for instance that corresponding to a pH value 7, practice has shown that sometimes it is convenient to provide an improved potentiometer-titrimeter according to the present invention which is capable of measuring a plurality of unknown electroionic potentials which are distributed over the entire range of the instrument scale and in which it is possible to carry out the instantaneous control of the measuring error in any of a plurality of predetermined points of this scale. The potentiometer-titrimeter $P_2$ illustrated schematically in FIG. 3 is designed for this purpose. As can be observed in this figure, potentiometer $P_2$ comprises a bridge circuit electronic voltmeter V of known type provided with indicating instrument 1 and zero adjusting knob 2 and has a set of unilateral voltmeter input terminals 4, 5, such as shown in FIG. 1.

Since potentiometer $P_2$ of FIG. 3 has been designed for the successive measurement of three unknown electroionic potentials, it comprises further a double-pole three position selector switch $Sw3$ the movable arms 29 and 30 of which are coupled to a common governing means not shown in the drawings and are connected to one of the switch contacts of commutator switch $Sw$ and to voltmeter input terminal 5 (through conductor 40), respectively.

Potentiometer $P_2$ is provided with one set of four control terminals 25, 26, 27, 28, the first of which is connected, on one hand, through conductor 37 to measuring electrode $Mec$ of a pair of control electrodes submerged in a standard solution $St$ of a known electroionic potential (for instance corresponding to a pH=7), while reference electrode $Rec$ of the same pair of control electrodes is connected, through conductor 38 and three sources of variable electrical counterpotentials $Cp1$, $Cp2$ and $Cp3$, and conductors 38', 38" and 38'" respectively, to the remaining control input terminals 26, 27 and 28 respectively.

Control input terminal 25 is also connected through conductor 41 to the other switch contact of selector switch $Sw$, while control input terminals 26, 27 and 28 are further connected to the switch contacts of selector switch $Sw3$ which cooperate with movable arm 30 thereof.

Potentiometer $P_2$ is also provided with three sets of indicating input terminals 19 and 20, 21 and 22, 23 and 24 respectively of which indicating input terminals 19, 21 and 23 are connected to those switch contacts of selector switch $Sw3$, which cooperate with movable arm 29 of this switch.

Indicating input terminals 20, 22 and 24 are connected in common through conductors 39 and 40 to voltmeter input terminal 5.

On the other hand, indicating input terminals 19, 21 and 23 are connected through conductors 31, 33 and 35, respectively, to measuring electrodes $Mei_1$, $Mei_2$ and $Mei_3$ respectively three pairs of indicating electrodes, the reference electrodes $Rei_1$, $Rei_2$ and $Rei_3$ of which are connected, through conductors 32, 34 and 36, respectively, to indicating input terminals 20, 22 and 24, respectively.

The pair of indicating electrodes $Mei_1$ and $Rei_1$ is submerged in a standard solution $St1$ having an electroionic potential corresponding for instance to a pH=8, the pair of indicating electrodes $Mei_2$ and $Rei_2$ is submerged in a second standard solution $St2$ corresponding for instance to a pH=5 and the pair of indicating electrodes $Mei_3$, $Rei_3$ is submerged in a third standard solution having an electroionic potential corresponding for instance to a pH=3.

As can be observed in FIG. 3, reference electrodes $Rei_2$ and $Rei_3$ are connected to their respective indicating input terminals 22 and 24 through sources of variable electrical counterpotential $Cp_1'$ and $Cp_2'$, respectively, the purpose of which will be explained hereinafter.

Potentiometer-titrimeter $P_2$ of FIG. 3 is used as follows:

With arm 3 of switch $Sw$ and arms 29 and 30 of switch $Sw3$ in their upper position, the electroionic potential of the first standard solution $St1$ (pH=8) is applied to voltmeter input terminals 4 and 5 and the instrument pointer is adjusted by means of knob 2 on that point of the instrument scale corresponding to the respective pH value (8).

By passing arm 3 of switch $Sw$ to its lower control position without modifying the position of switch $Sw3$, the electroionic potential of the reference standard solution $St$ (pH=7) is applied to voltmeter input terminals 4 and 5, thus obtaining a reading on the instrument scale which corresponds to that electroionic potential. With a view of compensating the inherent differences between the electrodes used in standard solutions $St1$ and $St$, counterpotential $Cp_1$ is adjusted so as to reset the instrument pointer on the reading corresponding to standard solution $St1$.

With arm 3 of switch $Sw$ again in its upper position and with arms 29 and 30 of switch $Sw3$ in their central position (corresponding to indicating input terminal 21 and control input terminal 27, respectively) the electroionic potential or standard solution $St2$ (pH=5) is applied to voltmeter input terminals 4 and 5 to obtain a reading on the instrument scale which corresponds to the abovementioned pH value. In view of the inherent differences which unavoidably exist between the various pairs of electrodes, the reading of the instrument pointer most probably will not coincide exactly with the desired pH value (5) and therefore, variable counterpotential $Cp_1'$ is varied so as to reset the instrument pointer on the desired pH value of the instrument scale.

With switch $Sw3$, in its central position switch $Sw$ is carried to its lower control position, so that the electroionic potential of standard solution $St$ is applied to voltmeter input terminals 4 and 5 in combination with variable electrical counterpotential $Cp_2$ which is adjusted in such a manner that the present reading of the instrument pointer coincides with that corresponding to the pH value of standard solution $St2$, i.e. pH=5.

By repeating the same operations with respect to standard solution $St3$ (pH=3), potentiometer $P_2$ is calibrated also on a further point of the instrument scale corresponding to this pH value, by adequately adjusting the values of counterpotentials $Cp_2'$ and $Cp_3$.

The above steps correspond to the calibration of potentiometer-titrimeter $P_2$ according to the present invention with respect to several points (in this particular case three) of the instrument scale, it being evident that the upper position of switch $Sw$ and the various positions of switch $Sw3$ correspond to the positions of measurement of three different unknown standard solutions which are substituted for standard solutions $St1$, $St2$ and $St3$, respectively, while the lower position of switch $Sw$, with switch $Sw3$ also in one of its three positions corresponds to the instantaneous control positions of the three different precalibrated points of the instrument scale, which correspond, in this particular instance to pH values 8, 5 and 3, all this having been obtained by the use of only one standard solution ($St$) which, in combination with three sources of variable electric counterpotentials ($Cp_1$, $Cp_2$, $Cp_3$) is maintained continuously connected to the potentiometer.

It will be understood that if during the instantaneous control step of any of the precalibrated control points on the instrument scale, the instrument pointer does not reproduce exactly the corresponding pH value, potentiometer $P_2$ is readjusted by using only and exclusively resetting knob 2 of instrument 1.

It will be further understood that while potentiometer $P_2$ of FIG. 3 has been shown as designed for the measurement of three different electroionic potentials, the same can be easily modified to measure any other desired number of different electroionic potentials.

It should be also understood that, though potentiometers P, $P_1$ and $P_2$ have been described in connection with the measurement of pH values, the same can be also used for measuring electroionic potentials of any type and origin, by merely using that set of control and indicating electrodes which are adapted to measure the electroionic potential of the type under investigation, for instance Red-Ox electrodes and rH electrodes.

It will be understood that the use of only one standard solution, combined with three different sources of variable electrical counterpotentials, for measuring several different electroionic potentials is also possible with a potentiometer-titrimeter according to the present invention of the bilateral input type, the standard solution with its variable and preset electrical counterpotentials being connected in this particular instance to one input side of the potentiometer, while the unknown electroionic potentials are applied to and measured at the opposite input side of the instrument.

It should be pointed out that when the potentiometer-titrimeter according to the present invention is designed for the measurement of $n$ different electroionic potentials, or in other words, when the potentiometer instrument scale is calibrated at $n$ different points thereof, with the use of only one standard solution as reference solution, it will be necessary to combine the standard solution with $n$ different variable electric counter-potentials, while at least $n-1$ electrode pairs, connected to the indicating input terminals of the potentiometer, must be also combined with different variable electrical counterpotentials.

Figure 4:
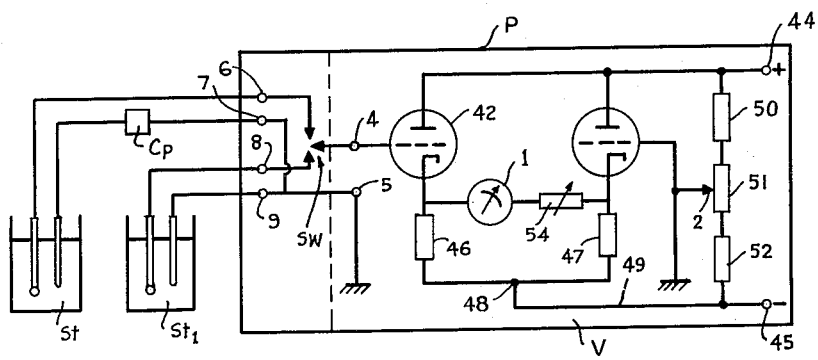
FIG. 4 is a schematic circuit diagram of the potentiometer-titrimeter of FIG. 1 showing the bridge circuit of the electronic voltmeter used therein with the "zero" adjusting means of the instrument pointer and the means for varying the sensibility range of the indicating instrument.

FIG. 4 is a schematic circuit diagram of a unilateral input type potentiometer-titrimeter P of the type shown in FIG. 1, but disclosing more in detail the circuit arrangement of electronic voltmeter V used therein. As can be observed in this figure, electronic voltmeter V is formed of two triodes 42 and 43 in a cathode follower bridge-circuit arrangement, the cathode circuits of tubes 42 and 43 including cathode resistors 46 and 47 respectively, the junction point 48 of which is connected through conductor 49 to the negative pole 45 of a stabilized voltage supply source.

The anodes of tubes 42 and 43 are connected directly to the positive pole 44 of the same stabilized voltage supply source.

Both cathodes of tubes 42 and 43 are interconnected through a current measuring instrument 1 corresponding to the electroionic potential indicator and connected in series with a variable resistor 53 by means of which the sensitivity ranges of the potentiometer-titrimeter can be adjusted at will. In other words by modifying the value of series resistor 54 it is possible to vary the scale range of indicating instrument 1.

The control grid of tube 42 is connected directly to voltmeter input terminal 4, while the other voltmeter input terminal 5 is connected to ground or neutral potential.

The control grid of tube 43 is connected through conductor 53 to ground or neutral potential and is simultaneously connected to the movable arm 2 of a potentiometer 51 forming part of a voltage divider comprising two series resistors 50 and 52 all connected between the positive and negative poles 44 and 45 of the stabilized voltage supply source of the potentiometer according to the present invention.

By adjusting the position of variable arm 2 of potentiometer 51 of the voltage divider (it corresponds to adjusting knob 2 of the other figures), the pointer of instrument 1 (a microamperimeter) can be adjusted at will on any desired point of the instrument scale (the so-called "zero adjustment").

The operation of potentiometer-titrimeter P shown in FIG. 4 is identical with that of FIG. 1.

It should be understood that though potentiometer-titrimeter P shown in FIG. 4 comprises an electronic voltmeter formed by two triodes, electronic tubes of any other type can be also used, and these tubes can be further substituted by suitable transistors or any other electronic devices of adequate characteristics.

FIG. 5 shows a further modification of the potentiometer-titrimeter P illustrated in FIG. 4 in which the cathodes of triodes 42 and 43 are interconnected through microameperimeter 1 with variable series resistor 54 which, in turn, can be connected in series with a plurality, for instance three, fixed resistors 56, 57 and 58 by means of selector switch 59 in a novel bandspread arrangement in which the width of each instrument indicating range or band can be adjusted by means of variable resistor 54. This circuit arrangement is used for compensating the ageing of reference and measuring electrodes Re and Me which, when new supply more mV for each pH unit, and variable resistor 54 can be used for compensating the variations originated by the ageing of the electrodes and the differences between various pairs of electrodes.

The "zero adjustment" of instrument 1 in potentiometer-titrimeter P of FIG. 5 is obtained by means of a potentiometer 55 interconnecting cathode load resistors 46 and 47 and the movable arm 2 of which is connected directly to the negative pole 45 of the stabilized voltage supply source of the potentiometer.

The main difference between the potentiometers shown in the previous figures and that illustrated in FIG. 5, is that in the latter the source of variable counterpotential is derived from the stabilized voltage supply source of the potentiometer by means of a Wheatstone bridge circuit arrangement formed of resistors 51″ and 51‴ and both halves of potentiometer 51′. As can be observed in FIG. 5, potentiometer 51′ is connected in series with resistors 50 and 52 between the positive and negative poles 44 and 45 of the potentiometer-titrimeter stabilized voltage supply source, the junction point between resistor 50 and potentiometer 51′ on one hand, and the junction point between resistor 52 and the other end of potentiometer 51′ on the other, being connected to the control grid of tube 43 through resistors 51″ and 51‴, respectively. Movable arm $Cp$ of potentiometer 51′ is connected by means of conductor 60 to control input terminal 7 of potentiometer P which is also connected, as shown in the previous figures, to reference electrode Rec of that pair of electrodes submerged in standard solution St.

The potentiometer-titrimeter shown in FIG. 6 is of the bilateral input type comprising a balanced electronic voltmeter formed of two triodes 61 and 62 in a cathode follower bridge circuit arrangement, cathode load resistors 63 and 64 of both triodes being interconnected through a potentiometer 65 the movable arm 2 of which is connected directly to negative pole 45 of the stabilized voltage supply source of the potentiometer-titrimeter.

The cathode of triodes 61 and 62 are interconnected, as shown in the previous figures, by indicating instrument 1 and variable resistor 54.

The control electrode of triode 61 is connected through conductor 69 to control measuring electrode Mec which cooperates with control reference electrode Rec, both electrodes being submerged in a standard solution St of known electroionic potential.

The control electrode of triode 62 is connected through conductor 70 to indicating measuring electrode Mei which cooperates with indicating reference electrode Rei, both electrodes being submerged in standard solution St1.

Control reference electrode Rec is connected through conductor 68 to movable arm 72 of potentiometer 67 which forms part of a voltage divider comprising also resistors 50 and 53, connected in series between the poles 44 and 45 of the stabilized voltage source of the potentiometer according to the present invention. Thus, a variable electrical counterpotential can be introduced at will in the circuit of electrodes Rec and Mec which are submerged in standard solution St, and this counterpotential is referred to ground potential in view of the fact that the ends of potentiometer 67 are connected to ground through resistors 51″ and 51‴, the junction point of which is connected to ground through conductor 66.

Indicating reference electrode Rei is connected through conductor 71 to movable arm 73 of potentiometer 51′ which, as can be observed in FIG. 6, is connected in parallel with potentiometer 67, thus supplying to the circuit of indicating electrodes Rei and Mei a second counterpotential which, being also referred to ground potential through resistors 51″ and 51‴, is independent of the counterpotential supplied by potentiometer 67 to the control electrodes in standard solution St.

One of the advantages of the potentiometer-titrimeter shown in FIG. 6 resides in the fact that all counterpotentials used are derived from the same stabilized voltage supply source by means of the same series connected resistors. Thus, the variations of the stabilized voltage supply source affect in the same manner both counterpotentials obtained by means of potentiometers 67 and 51', so that a variation of the voltage supply source does not introduce an error into the measurements.

A further advantage of the potentiometer-titrimeter shown in FIG. 6 is that both counterpotentials are referred to the same reference potential, i.e. ground potential so that in this particular case the small potential variations which may be present in ground connection affect both counterpotentials in the same way and thus do not influence the precision of the measurements carried out with the potentiometer-titrimeter according to the present invention.

It will be understood that by connecting one or more potentiometers in parallel with potentiometer 67, the number of counterpotentials available can be enlarged at will.

The invention is not to be construed as limited to the particular embodiments and/or circuit arrangements that have been disclosed, since these are illustrative, but the scope of the invention is indicated in the claims.

What I claim is:

1. The method of measuring an electroionic potential, comprising the steps of measuring the known electroionic potential of a first standard solution to obtain a first electric magnitude, measuring the known electroionic potential of an identical second standard solution to obtain a second electric magnitude, injecting into said second electric magnitude an electric counterpotential to equalize said first and said second electric magnitudes, substituting a solution of unknown electroionic potential for one of said standard solutions and measuring said unknown electroionic potential to obtain a third electric magnitude corresponding directly to said unknown electroionic potential.

2. The method of measuring an electroionic potential and of instantaneously controlling the measured electroionic potential, comprising the steps of measuring the known electroionic potential of a first standard solution to obtain a first electric magnitude representative of said known electroionic potential, measuring the known electroionic potential of an identical standard solution to obtain a second electric magnitude representative of the electroionic potential of said second standard solution, injecting into said second electric magnitude an adjustable electric counterpotential to equalize said first and said second electric magnitudes, substituting a solution of unknown electroionic potential for one of said standard solution while maintaining the other of said standard solution in a condition of measurement to obtain a third electric magnitude directly indicative of the unknown electroionic potential of said unknown solution, and measuring the known electroionic potential of said other standard solution while maintaining constant said adjustable electric counterpotential to obtain a fourth electric magnitude indirectly indicative of the measuring error.

3. The method of measuring an electroionic potential and of controlling the measured electroionic potential, comprising the steps of measuring electronically the known electroionic potential of a first standard solution to obtain a first electric magnitude, adjusting electrically said first electric magnitude to obtain a first reading representing directly and exactly the electroionic potential of said first standard solution, measuring electronically the known electroionic potential of an identical second standard solution to obtain a second electric magnitude, injecting into said second electric magnitude an adjustable electric counter-potential to obtain a second reading identical with said first reading, substituting a solution of unknown electroionic potential for said first standard solution while maintaining said second standard solution in a condition of measurement and maintaining constant said adjustable electric counterpotential, measuring the unknown electroionic potential of said unknown solution to obtain a third electric magnitude representing the uncontrolled value of said unknown electroionic potential, measuring the electroionic potential of said second standard solution while maintaining constant said electric counterpotential to obtain a fourth electric magnitude representing the controlled magnitude of the electroionic potential of said second standard solution, equalizing electrically said fourth electric magnitude with said first reading to eliminate the measuring error, and repeating the measurement of the unknown potential to obtain a third reading representing the controlled, exact and direct indication of the said unknown potential.

4. The method of measuring electroionic potentials, comprising the steps of measuring simultaneously the known electroionic potentials of a first and a second identical standard solutions to obtain a first electric magnitude, adjusting said first electric magnitude on a first reading representing directly the nominal electroionic potential of said first and said second standard solutions by injecting into the electroionic potential of one said standard solutions an adjustable electric counter-potential, substituting a solution of unknown electroionic potential for one of said standard solutions while maintaining the other of said standard solutions in the former condition of measurement, and measuring the electroionic potential of said unknown solution simultaneously with the electroionic potential of said other standard solution to obtain a second electric magnitude directly representing the electroionic potential of said unknown solution.

5. A unilateral input potentiometer-titrimeter for measuring electroionic potentials, comprising a high input-impedance bridge circuit electronic voltmeter constituted of two electronic discharge tubes each having an anode, a control grid and a cathode, a stabilized voltage supply source, means to connect the anodes of said tubes to the positive pole of said voltage supply source, a cathode load resistor connected in series with the cathode circuit of each of said tubes with the junction point of both cathode lead resistors being connected to the negative pole of said stabilized voltage supply source, a current measuring instrument, constituting an electroionic potential indicator connected in series with a variable resistor between the cathodes of said tubes, the control grid of one of said tubes being connected to ground potential and to the movable arm of a potentiometer forming part of a voltage divider connected between the positive and negative poles of said stabilized voltage supply source, a pair of voltmeter input terminals, means to connect the control grid of the other tube to one of said voltmeter input terminals, means to connect the other voltmeter input terminal to ground potential, one pair of control input terminals, one pair of indicating control terminals, a pair of control electrodes, means to connect said pair of control electrodes to said pair of control input terminals, a pair of indicating electrodes, means to connect said pair of indicating electrodes to said indicating input terminals, a source of electrical counterpotential connected in the circuit between said pair of control electrodes and said pair of control input terminals, means to vary said electrical counterpotential, a one-pole selector switch having a selector arm and two switch contacts, means to connect said switch selector arm to the voltmeter input terminal connected to the control grid of one of the voltmeter tubes, means to connect one of said pair of control input terminals to one of said switch contacts, means to connect one of said indicating input terminals to the other of said switch contacts, and means to connect the other control input terminal and the other indicating input terminal to the other voltmeter input terminal.

6. A unilateral potentiometer-titrimeter for measuring electroionic potentials according to claim 5, wherein the cathodes of the voltmeter tubes are interconnected by said indicator current measuring instrument connected in series with a variable resistor and with means to connect selectively one of a plurality of different fixed resistors in series with said instrument and said variable resistor.

7. A unilateral potentiometer-titrimeter for measuring electroionic potentials according to claim 5, wherein said pair of control electrodes includes a reference electrode and a measuring electrode, the control grid of one of the voltmeter tubes is connected to ground potential and to the junction point of two resistors, the other ends of which are connected to the ends of the potentiometer forming the central element of a voltage divider comprising two other resistors and connected between the positive and negative poles of the stabilized voltage supply source, while the movable arm of said potentiometer is connected to the control input terminal connected to the reference electrode of the pair of control electrodes to constitute a source of variable counterpotential.

8. A bilateral input potentiometer-titrimeter for measuring electroionic potentials, comprising a high input-impedance bridge-circuit electronic voltmeter having a first pair of voltmeter input terminals connected to one arm of the voltmeter bridge circuit and a second pair of voltmeter input terminals connected to the opposite arm of the voltmeter bridge circuit and provided with an electroionic potential indicating instrument having instrument pointer adjusting means, a pair of control input terminals, a pair of indicating input terminals, a pair of control electrodes formed of a measuring electrode and a reference electrode, a pair of identical indicating electrodes formed of a measuring electrode and a reference electrode, means to connect the measuring electrode of said pair of control electrodes to one of said control input terminals, means to connect the reference electrode of said pair of control electrodes to the other control input terminal, a source of electrical counterpotential connected between said reference control electrode and the corresponding control input terminal, means to vary said electrical counterpotential, means to connect the measuring electrode of said pair of indicating electrodes to one of the said pair of indicating input electrodes, means to connect the reference electrode of the said pair of indicating electrodes to the other indicating input terminal, a first and a second double-throw double-pole switch, means to connect the movable arm of said first switch to said first voltmeter input terminals, means to connect the movable arm of said second switch to said second voltmeter input terminals, means to shortcircuit one set of switch contacts of said first switch corresponding to the first position of said switch, means to connect the other set of switch contacts of said first switch corresponding to the second position of said first switch to said pair of control terminal, means to shortcircuit one set of switch contacts of said second switch corresponding to the first position of said switch, means to connect the other set of switch contacts of said second switch corresponding to the second position of said switch to said pair of indicating input terminals, and means to move simultaneously said first and second second switches from said first position to said second position and vice versa.

9. A bilateral input potentiometer-titrimeter according to claim 8, comprising means to derive said electric counterpotential from the stabilized voltage supply source of the potentiometer.

10. A bilateral input potentiometer-titrimeter according to claim 8, comprising a high input impedance bridge circuit electronic voltmeter formed of a first and a second triode each having an anode, a control grid and a cathode, said anodes being connected to the positive pole of a stabilized voltage supply source, the cathode circuits of said triodes each including a cathode load resistor the ends of which, remote from said cathodes, are connected to the ends of a potentiometer the movable arm of which is connected to the negative pole of said stabilized voltage supply source, said cathodes being interconnected by a current measuring instrument constituting the electroionic potential indicator connected in series with a variable resistor, the control grid of said first triode being connected to the measuring electrode of a pair of control electrodes which also includes a reference electrode, the control grid of said second triode being connected to the measuring electrode of a pair of indicating electrodes also including a reference electrode, a voltage divider formed of two resistors and a first central potentiometer connected in series between the positive and negative poles of said voltage supply source, the movable arm of said potentiometer being connected to the reference electrode of said pair of control electrodes to constitute a variable electric counterpotential in the circuit of said control electrodes, a second potentiometer connected in parallel with said first potentiometer and having its ends connected to ground potential through two fixed resistors, the movable arm of said second potentiometer being connected to the reference electrode of said pair of indicating electrodes to constitute a source of variable electrical counterpotential in the circuit of said indicating electrodes.

11. A unilateral input potentiometer-titrimeter for measuring electroionic potentials comprising a high input impedance electronic voltmeter having an electroionic potential indicator instrument provided with instrument pointer adjusting means, a pair of voltmeter input terminals connected to said voltmeter, a set of four control input terminals, a set of six indicating input terminals, a pair of control electrodes formed of a measuring electrode and a reference electrode submerged in a standard solution of known electroionic potential, three sources of different and variable electrical counterpotentials, means to connect the measuring electrode of said pair of control electrodes to the first of said control input terminals, means to connect one pole of said three electrical counterpotentials to said control reference electrode, means to connect the other poles of said variable electrical counterpotentials to said second, third and fourth control inpu terminals respectively, a first, second and third pair of identical indicating electrodes each formed of a measuring electrode and a reference electrode and submerged in a first, second and third indicating standard solutions, respectively of different known electroionic potentials, means to connect the measuring and reference electrodes of said first pair of indicating electrodes to the first and second input terminals respectively, of said set of six indicating terminals, means to connect the measuring and reference electrodes of said second pair of indicating electrodes to the third and fourth terminals, respectively, of said set of six indicating terminals, means to connect said measuring and said reference electrodes of said third pair of indicating electrodes to the fifth and sixth terminals, respectively, of said set of six indicating input terminals, a fourth source of variable electrical counterpotential connected in the circuit of said second pair of indicating electrodes, a fifth source of variable electrical potential connected into the circuit of said third pair of indicating electrodes, a three-position double-pole selector switch having a first and a second movable arms each cooperating with a set of a first, second and third switch contacts, a selector switch having a movable arm and cooperating with a first and second switch contact, means to connect the movable arm of said selector switch to one of the voltmeter input terminals, means to connect the other voltmeter input terminal to the second movable arm of said double-pole selector switch, means to connect said second, fourth and sixth terminal of said set of six indicating input terminals to said other voltmeter input terminal, means to connect said first, third and fifth terminals of said set of six indicating input terminals to the first, second and third switch contacts, respectively, of said first double-pole selector switch arm, means to connect said first double-pole selector switch arm to the first switch contact of said selector switch, means to connect the first terminal of said set of four of control terminals to the second switch contact of said selector switch, means to connect said second, third and fourth control terminals to the first, second and third switch contacts, respectively, corresponding to said second double-pole selector switch arm, said first, second and third pair of indicating electrodes being simultaneously submersible into a first, second and third solution of unknown and different electro-ionic potentials, respectively.

References Cited in the file of this patent
UNITED STATES PATENTS

| | | |
|---|---|---|
| 2,181,866 | Cameron | Dec. 5, 1939 |
| 2,183,531 | Allison | Dec. 19, 1939 |
| 2,311,976 | Coleman | Feb. 23, 1943 |
| 2,367,746 | Williams | Jan. 23, 1945 |
| 2,618,674 | Stanton | Nov. 18, 1952 |